US009400832B1

(12) United States Patent
Mayle et al.

(10) Patent No.: US 9,400,832 B1
(45) Date of Patent: Jul. 26, 2016

(54) DYNAMIC BITWISE SHARDING OF LIVE STREAM COMMENT GROUPS

(71) Applicant: Google Inc., Mountain View, CA (US)

(72) Inventors: Douglas Michael Mayle, San Francisco, CA (US); Joshua R. Siegel, Los Angeles, CA (US)

(73) Assignee: GOOGLE INC., Mountain View, CA (US)

( * ) Notice: Subject to any disclaimer, the term of this patent is extended or adjusted under 35 U.S.C. 154(b) by 380 days.

(21) Appl. No.: 14/017,221

(22) Filed: Sep. 3, 2013

Related U.S. Application Data

(63) Continuation of application No. 13/536,822, filed on Jun. 28, 2012, now Pat. No. 8,549,005, and a continuation of application No. 13/245,828, filed on Sep. 26, 2011, now Pat. No. 8,234,280, and a continuation of application No. 13/194,036, filed on Jul. 29, 2011, now Pat. No. 8,195,665.

(51) Int. Cl.
  *G06F 7/00* (2006.01)
  *G06F 17/30* (2006.01)
(52) U.S. Cl.
  CPC ............................... *G06F 17/30598* (2013.01)
(58) Field of Classification Search
  CPC ................................................. G06F 17/30598
  USPC .......................................................... 707/737
  See application file for complete search history.

(56) References Cited

U.S. PATENT DOCUMENTS

| 8,195,665 | B1 | 6/2012 | Mayle et al. |
| 8,234,280 | B1 | 7/2012 | Mayle et al. |
| 8,549,005 | B1 | 10/2013 | Mayle et al. |
| 2002/0161768 | A1* | 10/2002 | Miller .................. G06F 9/5061 |
| 2007/0198591 | A1 | 8/2007 | Teng et al. |
| 2009/0260016 | A1 | 10/2009 | Ramakrishnan et al. |
| 2010/0042637 | A1 | 2/2010 | Tsuchida et al. |
| 2010/0161617 | A1 | 6/2010 | Cao et al. |
| 2010/0198826 | A1 | 8/2010 | Petersen et al. |
| 2010/0241629 | A1 | 9/2010 | Tatemura et al. |
| 2011/0029376 | A1 | 2/2011 | Mills et al. |
| 2011/0060821 | A1 | 3/2011 | Loizeaux et al. |
| 2011/0196855 | A1 | 8/2011 | Wable et al. |

(Continued)

OTHER PUBLICATIONS

Ovid. "Sharding Your Database." May 13, 2010. http://blogs.perl.org/users/ovid/2010/05/sharding-your-database.html.*

(Continued)

*Primary Examiner* — Kimberly Wilson
(74) *Attorney, Agent, or Firm* — Lowenstein Sandler LLP

(57) ABSTRACT

Groups of users accessing content are generated and modified to allow the users to more easily interact with each other. A number of groups and a maximum number of users in a group are received and used to generate shards. In one embodiment, the number of shards generated is based on the number of groups received. Each shard is associated with a unique shard identifier. In one embodiment, a user is associated with a shard when the user accesses content. For example, when a comment is received from a client device associated with a user, a user identifier is determined and associated with a shard. Using the shards, groups of users are generated. In one embodiment, a substring of the shard identifiers associated with the shards is determined and users associated with shard identifiers having the same substring of the shard identifier are included in a group.

15 Claims, 5 Drawing Sheets

(56) References Cited

U.S. PATENT DOCUMENTS

| | | | |
|---|---|---|---|
| 2011/0282832 A1 | 11/2011 | Rishel et al. | |
| 2012/0036080 A1* | 2/2012 | Singer | G06Q 10/10 705/319 |
| 2012/0050257 A1 | 3/2012 | Clarke | |
| 2012/0054180 A1 | 3/2012 | Priyadarshan et al. | |
| 2012/0054217 A1 | 3/2012 | Clarke | |
| 2012/0142429 A1 | 6/2012 | Muller | |
| 2012/0254175 A1* | 10/2012 | Horowitz | G06F 17/30584 707/737 |

OTHER PUBLICATIONS

P2P File Sharing, Internet, retrieved at http://www.p2p-weblog.com/50226711/altnet_launches_global_file_registry. php, 4 pages, 2009.

Altnet, Internet, retrieved at, http://www.globalregistry.com/assets/Global_File_Registry_White_Paper.pdf, May 26, 2006, 20 pages.

U.S. Office Action for U.S. Appl. No. 13/194,036 mailed Dec. 12, 2011.

Notice of Allowance for U.S. Appl. No. 13/194,036 mailed Apr. 26, 2012.

U.S. Office Action for U.S. Appl. No. 13/245,828 mailed Dec. 12, 2011.

Notice of Allowance for U.S. Appl. No. 13/245,828 mailed May 3, 2012.

U.S. Office Action for U.S. Appl. No. 13/536,822 mailed Oct. 11, 2012.

Notice of Allowance for U.S. Appl. No. 13/536,822 mailed May 31, 2013.

* cited by examiner

DYNAMIC BITWISE SHARDING OF LIVE STREAM COMMENT GROUPS

CROSS REFERENCE

This application is a continuation application of U.S. patent application Ser. No. 13/536,822, filed Jun. 28, 2012, entitled "DYNAMIC BITWISE SHARDING OF LIVE STREAM COMMENT GROUPS," which is a continuation of U.S. patent application Ser. No. 13/245,828, filed Sep. 26, 2011, now U.S. Pat. No. 8,234,280, issued on Jul. 31, 2012, entitled "DYNAMIC BITWISE SHARDING OF LIVE STREAM COMMENT GROUPS," which is a continuation of U.S. patent application Ser. No. 13/194,036, filed on Jul. 29, 2011, now U.S. Pat. No. 8,195,665, issued on Jun. 5, 2012, entitled "DYNAMIC BITWISE SHARDING OF LIVE STREAM COMMENT GROUPS."

TECHNICAL FIELD

The present disclosure generally relates to content management system, and more specifically, to generating groups of users accessing content.

BACKGROUND

Increasing numbers of users view content, such as video data, online using one or more video hosting sites. Additionally, many video hosting sites allow users to view streaming video of live events or other content in real-time. Often, users viewing content provide comments, such as text data, related to the content, and these comments are presented along with the content. Receiving and distributing comments allows a video hosting site to provide a forum for visitors to interact with each other while viewing content, enhancing user interaction with the video hosting site.

However, when content is popular, a large number of users may view the content, making it impractical for users accessing the content to provide comments and view comments from other users in a single location. For example, if over one thousand viewers view content, such as a live event, concurrently, it is unwieldy for a video hosting site to receive and present comments from all of the users in a single location. Some conventional video hosting sites seek to mitigate this by partitioning users into groups having a fixed size, where users within a group view comments received from other users within the group but do not view comments received from users included in a different group.

However, conventional methods for partitioning users into groups specify a maximum number of users within a group and when the maximum number of users is reached in a group, a new group is created and users are added to the new group until it reaches the maximum number of users. While this limits the group size, partitioning users based solely on number of users in a group allows certain users to be included in a group without any other users, limiting the user's ability to interact with other users.

SUMMARY

In accordance with an embodiment, groups of users accessing content are dynamically generated. A number of groups and a maximum number of users in a group are received and used to generate shards. In one embodiment, the number of shards generated is based on the number of groups received. Each shard is associated with a unique shard identifier. When a user accesses content, the user is associated with a shard. For example, when a comment is received from a client device associated with a user, a user identifier is determined and associated with a shard. Using the shards, groups of users are generated. In one embodiment, a substring of the shard identifiers associated with the shards is determined and users associated with shard identifiers having the same substring of the shard identifier are included in a group.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

Embodiments are illustrated by way of example, and not by way of limitation in the figures of the accompanying drawings in which like reference numerals are used to refer to similar elements.

DETAILED DESCRIPTION

Figure 1:
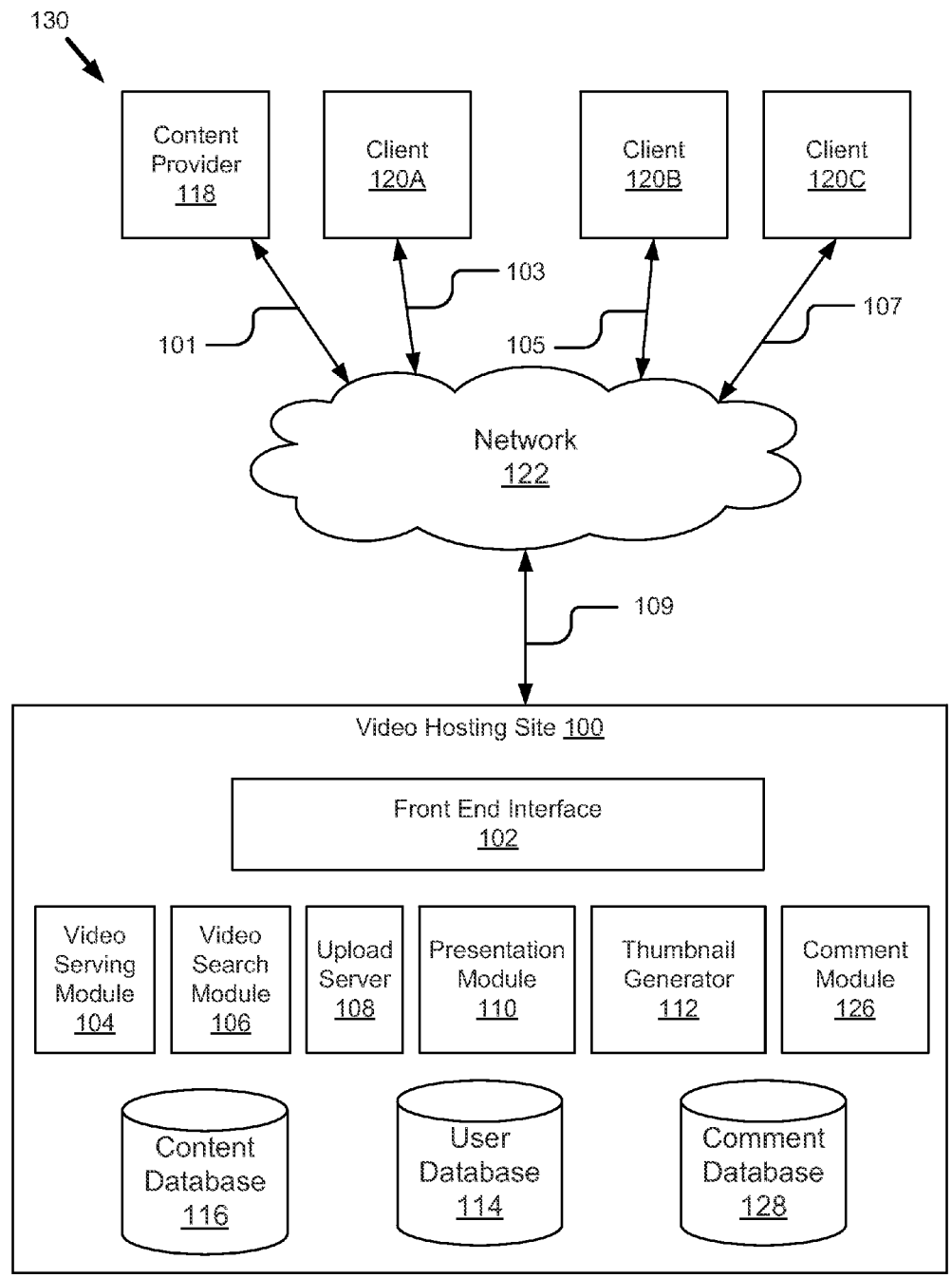
FIG. 1 is a high-level block diagram of a system for managing content according with an embodiment.

A system and method for grouping users accessing content from a video hosting site is described below. In the following description, for purposes of explanation, numerous specific details are set forth in order to provide a thorough understanding. It will be apparent, however, to one skilled in the art that various embodiments can be practiced without these specific details. In other instances, structures and devices are shown in block diagram form in order to avoid obscuring certain details. For example, an embodiment is described below with reference to user interfaces and particular hardware. However, other embodiments can be described with reference to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk-read only memory (CD-ROM), compact disk-read/write (CD-R/W) and digital video disc (DVD).

A data processing system suitable for storing and/or executing program code includes at least one processor coupled directly or indirectly to memory elements through a system bus. The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the disclosure herein, or it may prove convenient to construct more specialized apparatus to perform the required method steps. The required structure for a variety of these systems will appear from the description below. It will be appreciated that a variety of programming languages may be used to implement the disclosure of the embodiments as described herein.

System Overview

FIG. 1 is a high-level block diagram of one embodiment of a system 130 for maintaining and distributing content. The system 130 illustrated by FIG. 1 includes a video hosting site 100, a content provider 118 and one or more clients 120A, 120B, 120C. In the illustrated embodiment, the components are communicatively coupled via a network 122. In other embodiments, a greater or fewer number of content providers 118 and/or clients 120 than shown in FIG. 1 are communicatively coupled to the network 122. Furthermore, while FIG. 1 illustrates a single network 122, in other embodiments, the system 130 includes any number of networks 122.

The network 122 is a conventional type of network, wired or wireless, and may have any number of configurations such as a star configuration, token ring configuration or other configurations known to those skilled in the art. In one embodiment, the network 122 comprises one or more of a local area network (LAN), a wide area network (WAN) (e.g., the Internet), and/or any other interconnected data path across which multiple devices communicate. In another embodiment, the network 122 is a peer-to-peer network. The network 122 is coupled to or includes portions of a telecommunications network for sending data in a variety of different communication protocols. For example, the network is a 3G network or a 4G network. In yet another embodiment, the network 122 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 122 are encrypted using conventional encryption technologies such as secure sockets layer (SSL), secure HTTP and/or virtual private networks (VPNs).

In the illustrated embodiment, the video hosting site 100 is communicatively coupled to the network 122 via signal line 109. The content provider 118 is communicatively coupled to the network 122 via signal line 101. A client 120A is communicatively coupled to the network 122 via signal line 103. Clients 120B, 120C communicatively coupled to the network 122 via signal line 105 and signal line 107, respectively.

The video hosting site 100 is a system allowing users to access video content via searching and/or browsing interfaces. An example of a video hosting site 100 is the YOUTUBE™ website. Other video hosting sites are known as well, and can be adapted to operate according to the disclosure herein. It will be understood that the term "web site" represents any computer system adapted to serve content using any Internet working protocol, and is not intended to be limited to content uploaded or downloaded via the Internet or the HTTP protocol.

In one embodiment, the video hosting site 100 receives video data, or other content, via uploads of videos by users of clients 120 or uploads from a content provider 118. Alternatively, the video hosting site 100 searches, or crawls, other web sites, databases of videos or other sources for content, such as video data. In another embodiment, the video hosting site 100 receives content from a combination of uploads and searching for content. For example, a video hosting service 100 receives content from one or more clients 120 responsive to the client 120 receiving a user request to upload content to the video hosting site 100. As another example, the video hosting service 100 receives content by crawling clients 120 and/or crawling a content provider 118 and/or additional sources to obtain content, allowing real-time acquisition of content.

In one embodiment, the video hosting site 100 is configured to receive and distribute various types of content, such as video data, audio data, image data, textual data or other types of data. The content received and/or distributed by the video hosting site 100 may be represented using any suitable media type and/or file type. For example, the video hosting site 100 shares content such as a video, audio, combination of video and audio, image such as a JPEG or GIF file and/or a text file.

The video hosting site 100 is communicatively coupled to the network 122. In the embodiment shown by FIG. 1, the video hosting site 100 includes: a front end interface 102, a video serving module 104, a video search module 106, an upload server 108, a presentation module 110, a thumbnail generator 112, a user database 114, a content database 116, a comment module 126 and a comment database 128. The components of the video hosting site 100 are communicatively coupled to one another, such as via a bus. For clarity, conventional features of the video hosting site 100, such as firewalls, load balancers, authentication servers, application servers, failover servers, site management tools, and so forth are not shown in FIG. 1. In one embodiment, the illustrated components of the video hosting website 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the video hosting website 100 are performed by one or more clients 120 in other embodiments if appropriate. In one embodiment, the functionality attributed to a particular component is performed by different or multiple components operating together.

In one embodiment, the various servers and modules are implemented as a program executing on a computing device, such as a server-class computer, comprising a processor, a memory, a network interface, one or more peripheral interfaces and other well-known components. For example, a server-class computer is a computing device executing an open-source operating system such as LINUX, includes a high-performance processor, includes 1 G or more of memory and includes 100 G or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in tangible computer readable storage mediums (e.g., RAM, hard disk, or optical/magnetic media).

The front end interface 102 is an interface that handles communication with the content provider 118 and/or the client 120 via the network 122. For example, the front end interface 102 receives video data uploaded from the content provider 118 and delivers the video contents to the upload server 108. In one embodiment, the front end interface 102 receives requests from users of the client devices 120 and delivers the requests to the other components of the video hosting site 100 (e.g., the video search module 106 or the video serving module 104). For example, the front end interface 102 receives a video search query from a user and sends the video search query to the video search module 106. As another example, the front-end interface 102 receives a comment from a client 120 and communicates the comments to the comment module 126.

The upload server 108 receives video data or other content from the content provider 118 via the front end interface 102. In one embodiment, the upload server 108 processes the content and stores the processed content in the content database 116. For example, the upload server 108 assigns a video identifier ("video ID") to video data and stores the video content together with the video ID in the content database 116. In other embodiments, the upload server 108 also performs one or more of: formatting the content, compressing the content, associating one or more tags with the content, analyzing the content or performs other processing of the content.

The content database 116 is a storage system that stores content shared by the video hosting site 100 with one or more clients 120A, 120B, 120C. In one embodiment, the content database 116 stores content processed by the upload server 108. In another embodiment, the content database 116 also stores metadata associated with content. For example, the content database 116 stores one or more of a title, a description, tag information, a duration of the content and/or other suitable data associated with the content. In one embodiment, some or all of the metadata associated with the content is provided by the content provider 118.

The video search module 106 is code and routines that, when executed by a processor (not pictured), processes a search query received by the front end interface 102 from a client 120. A search query received by the front end interface 102 from a client 120 includes search criteria such as keywords identifying videos a user of a client 120 is interested in viewing. The video search module 106 uses the search criteria to query metadata associated with content stored in the content database 116. The search results from the query are transmitted to the front end interface 102 for transmission to the client 120 requesting the content associated with the search results. For example, if a user provides the front end interface 102 with a keyword search query via a client 120 and the network 122, the video search module 106 identifies videos stored in the content database 116 related to the keyword and returns the search result to the front end interface 102.

The video serving module 104 is code and routines that, when executed by a processor (not pictured), processes requests for videos, or other content, and provides videos to clients 120. For example, the video serving module 104 receives a query from a user via the front end interface 102 and the client 120 and retrieves a set of videos from the content database 116 based on the query.

In one embodiment, the video serving module 104 receives a request from a user to access a video when the user clicks on a link to the video presented by a client 120. The request received from the user includes a video ID of the video to be viewed. In one embodiment, the video ID is included automatically in the request once the user clicks on the link for the video. The video serving module 104 uses the video ID to search and locate the video in the content database 116. Once the requested video is located, the video serving module 104 transmits the video to the front end interface 102. The video is presented to the user on a web page. In one embodiment, metadata associated with the video is also presented with the video, such as the title and description of the video. In one embodiment, after transmitting the video to the user, the video serving module 104 stores the video ID of the video in the user database 114 with the data of the respective user.

The user database 114 is a storage system that stores data and/or information associated with a user. For example, the user database 114 stores the video IDs of video contents uploaded by a user to the video hosting site 100 and the video IDs of video contents that the user has accessed from the content database 116 for viewing. In one embodiment, the user is identified by using a login name and password and/or by using the user's internet protocol address. Additionally, the user database 114 may include data associated with the user, such as a user profile specifying preferences or attributes of the user. For example, the user database 114 includes a user profile specifying a location associated with a user, interests associated with the user, privacy settings associated with the user and/or other demographic information associated with the user.

The thumbnail generator 112 is code and routines that generates a thumbnail for a video. A thumbnail is an image representing a video in the video hosting site 100. In one embodiment, the thumbnail is communicated to a client 120, which displays the thumbnail to identify the video. For example, the thumbnail generator 112 analyzes the video and selects a frame of the video as the thumbnail. In one embodiment, the thumbnail generator 112 provides one or more pictures for the video and the user uploading the video to the video hosting site 100 selects one picture as the thumbnail.

The comment database 128 is a storage device including comments received from one or more clients 120A, 120B, 120C associated with content. For example, the comment database 128 includes comments, such as text data, received from a client device 120A and associated with video data viewed using the client device 120A. In one embodiment, the comment database 128 includes the comment, a video ID and a user identifier associated with the user of the client 120 from which the comment was received. The data included in the comment database 128 may differ in different embodiments. In one embodiment, the comment database 128 is a table with different columns of the table including a different type of data. For example, a first column includes video IDs, a second column includes a user identifier and a third column includes the comment, such as text or other data comprising the comment.

The comment module 126 is computer instructions (e.g., executable computer code) that, when executed by a processor (not pictured), generate an interface allowing users of a client device 120 to enter comments associated with content and/or to view comments entered by users of other client devices 120. In one embodiment, a graphical interface generated by the comment module 126 displays the content in addition to comments received from client devices 120 and a data entry region for a user to enter a comment. For example, an interface generated by the comment module 126 includes video data in addition to comments received from client devices 120A, 120B and a data entry region allowing a user of client device 120C to communicate comments to the video hosting site 100 via the network 122.

In one embodiment, the comment module 126 also includes data identifying different groups of users so that users within a group view comments from other users within the group but do not view comments from users within other groups. For example, if multiple users are viewing video data, the comment module 126 segments the users into groups to limit the number of comments presented to different users. Thus, rather than present received comments to all users, by generating groups of users, the comment module 126 presents comments from a user to other users within the same group and does not present the comments from the user to users within a different group. This grouping of users allows users to more easily monitor and review comments and to more easily provide comments.

To separate users concurrently accessing content into groups as the number of users accessing the content increases, the comment module 126 associates the users with different shards, a grouping of users in a distinct subset, and uses the shards to produce one or more groups of users. In this manner, shards are organized to ensure groups contain more than a single user. Additionally, associating users with shards allows the comment module 126 to account for geographic location, language choice or other factors when generating a group, thereby increasing the likelihood that a group includes users who are likely to communicate with each other based on similar user attributes or characteristics. The comment module 126 is further described below in conjunction with FIG. 2B.

In general, functions described in one embodiment as being performed on the server side can also be performed on the client side in other embodiments if appropriate. In addition, the functionality attributed to a particular component can be performed by different or multiple components operating together.

The content provider 118 is any device that provides content to the video hosting site 100. For example, the content provider 118 is a computing device that uploads a video to the video hosting site 100. The content provider 118 is communicatively coupled to the network 122. In one embodiment, the content provider 118 is a client 120. In one embodiment, the content provider 118 communicates video data to the video hosting site 100, allowing video from the content provider 118 to be streamed to one or more clients 120A, 120B, 120C using the video hosting site 100. In yet another embodiment, the content provider 118 is the same entity that operates the video hosting site 100. In one embodiment, the content provider 118 provides one or more functions. Examples of functions provided by the content provider 118 include uploading content to the video hosting site 100, editing content stored by the video hosting site 100, removing content from the video hosting site 100, editing content provider preferences associated with a video content or any other suitable function.

Clients 120A, 120B, 120C, also referred to herein collectively and individually as client 120, are any computing device. A client 120 executes a web browser or another application and connects to the video hosting site 100 via the network 122. In one embodiment, the client 120 includes a variety of different computing devices. Examples of a client device 120 include, but are not limited to: a personal computer, a personal digital assistant, an internet-capable television, a tablet computer, a smart phone or a laptop computer. A client 120 includes a processor (not pictured), a memory (not pictured) and other components conventional to a computing device. In one embodiment, the client 120 is communicatively coupled to the network 122.

In one embodiment, the client 120 is configured as a content provider 118 to provide video data, or other content, to the video hosting site 100. In yet another embodiment, the client 120 is configured to access content, such as video data, stored by the video hosting site 100. For example, a client 120 includes an embedded video player (e.g., the Flash™ player from Adobe System, Inc.) adapted for the video content formats used in the video hosting site 100 so that a user of the client 120 is able to view a video from the video hosting site 100 using the embedded video player. In yet another embodiment, the client 120 configures user preferences related to the video contents.

Video Hosting Site 100

Figure 2A:
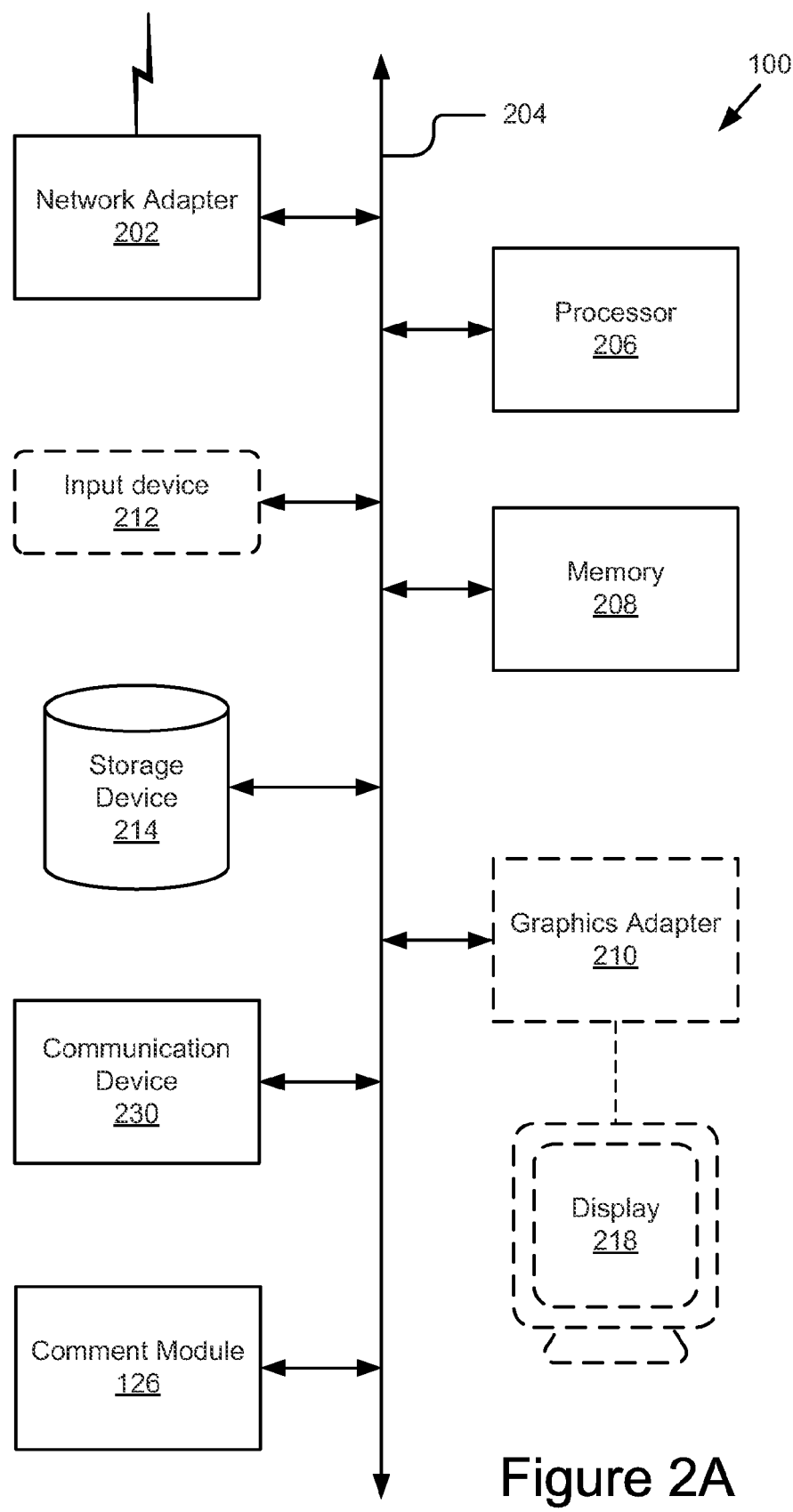
FIG. 2A is a block diagram of a video hosting site in accordance with an embodiment.

FIG. 2A is a block diagram of the video hosting site 100 in accordance with an embodiment. As illustrated in FIG. 2A, the video hosting site 100 includes a network adapter 202 coupled to a bus 204. According to one embodiment, also coupled to the bus 204 are at least one processor 206, memory 208, a graphics adapter 210, an input device 212, a storage device 214, and a communication device 230. In one embodiment, the functionality of the bus 204 is provided by an interconnecting chipset. The video hosting site 100 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the video hosting site 100. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The video hosting site 100 also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing log information on a more permanent basis. The memory 208 is coupled by the bus 204 for communication with the other components of the video hosting site 100. In one embodiment, the comment module 126 is stored in memory 208 and executable by the processor 206.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 214 includes instructions and/or data for maintaining metadata associated with video data, for modifying stored metadata or for retrieving stored video data or stored metadata associated with stored video data. For clarity, instructions and/or data stored by the storage device 214 are described herein as different functional "modules," where different modules are different instructions and/or data included in the storage device that cause the described functionality when executed by the processor 206.

The input device 212 may include a mouse, track ball, or other type of pointing device to input data into the video hosting site 100. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the video hosting site 100 to a local or wide area network.

The communication device 230 transmits data from the CMS 110 to the network 150 and receives data from the network 150. The communication device 230 is coupled to the bus 204. In one embodiment, the communication device 230 also exchanges data with one or more of the analytics server 123, the data store 120, the cache 130 and/or one or more advertising servers 140 using communication channels other than the network 150. In one embodiment, the communication device 230 includes a port for direct physical connection to the network 150 or to another communication channel. For example, the communication device 230 includes a USB, SD, CAT-5 or similar port for wired communication with the network 150. In another embodiment, the communication device 230 includes a wireless transceiver for exchanging data with the network 150, or with another communication channel, using one or more wireless communication methods, such as IEEE 802.11, IEEE 802.16, BLUETOOTH® or another suitable wireless communication method.

In yet another embodiment, the communication device 230 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 230 includes a wired port and a wireless transceiver. The communication device 230 also provides other conventional connections to the network 150 for distribution of files and/or media objects using standard network protocols such as TCP/IP, HTTP, HTTPS and SMTP as will be understood to those skilled in the art.

FIG. 2A further illustrates a comment module 126 communicating over bus 204 with the other components of the video hosting site 100. The comment module 126 provides logic and instructions for receiving comments from one or more clients 120 and/or generating an interface for displaying received comments in conjunction with content. In an embodiment, the comment module 126 can be implemented in hardware (e.g., in an FPGA), as illustrated in FIG. 2A. In another embodiment, the comment module 126 can include software routines and instructions that are stored, for example, in memory 208 and/or storage device 214 and executable by the processor 206 to cause the processer to receive comments from one or more clients 120 and/or generate an interface for displaying received comments in conjunction with content. Details describing the functionality and components of the comment module 126 will be explained in further detail below with regard to FIG. 2B.

As is known in the art, the video hosting site 100 can have different and/or other components than those shown in FIG. 2A. In addition, the video hosting site 100 can lack certain illustrated components. In one embodiment, the video hosting site 100 lacks an input device 212, graphics adapter 210, and/or display 218. Moreover, the storage device 214 can be local and/or remote from the video hosting site 100 (such as embodied within a storage area network (SAN)).

As is known in the art, the video hosting site 100 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Comment Module 126

Figure 2B:
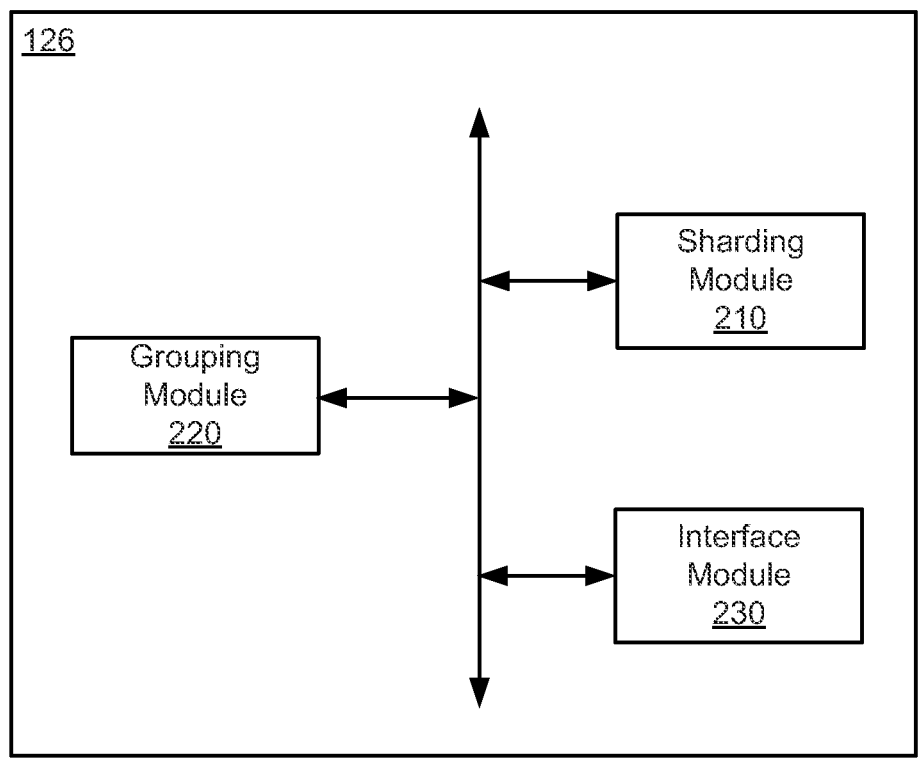
FIG. 2B is a block diagram of a comment module in accordance with an embodiment.

Referring now to FIG. 2B, the comment module 126 is shown in more detail. FIG. 2B is a block diagram illustrating the content module 126 according to one embodiment. The content module 126 is software and routines executable by the processor 206 for receiving comments from one or more clients 120 and/or generating an interface for displaying received comments in conjunction with content. In one embodiment, the content module 126 is a set of instructions executable by the processor 206 to provide the functionality described below for receiving comments from one or more clients 120 and/or generating an interface for displaying received comments in conjunction with content. In another embodiment, the content module 126 is stored in the memory 208 of the content module 126 and is accessible and executable by the processor 206. In either embodiment, the content module 126 is adapted for cooperation and communication with the processor 206 and other components of the video hosting site 100.

In the embodiment depicted by FIG. 2B, the comment module 126 includes a sharding module 210, a grouping module 220 and an interface module 230. However, in other embodiments, the content module 126 includes different and/or additional modules than the ones depicted in FIG. 2B.

The sharding module 210 is software and routines executable by a processor for associating users of client devices 120 with one or more shards. In one embodiment, the sharding module 210 implements a sharding process that accounts for user attributes when associating a user with a shard. For example, when a user of a client device 120 provides authentication credentials to the video hosting site 100, the sharding module 210 accesses the user database 114 and uses data included in a user profile when associating a user with a shard. For example, the sharding module 210 associates users having user profiles including the same, or similar, interests or including the same, or similar, locations with a specific shard. Alternatively, the sharding module 210 determines a location of a user accessing the video hosting site by Internet Protocol (IP) geolocation based on an IP address, or other identifier, associated with data received from the user via a client 120 and the network 122 and associates users having the same geolocation with a shard. Accounting for user demographic information and/or user location when associating users with shards increases the likelihood that users associated with a shard will interact with each other by providing comments to the video hosting site 100 and viewing comments provided by each other.

In one embodiment, the sharding module 210 also includes data identifying a number of shards to generate, allowing a user or administrator to specify the number of shards generated. Alternatively, the grouping module 220 includes data specifying a number of groups to generate and the sharding module 210 generates a number of shards equal to the number of groups identified by the grouping module 220.

Additionally, the sharding module 210 associates a shard identifier with different shards. In one embodiment, the shard identifier is a binary number associated with a shard. For example, the sharding module 210 generates four shards and associates a three-digit binary number with the different shard, so "000" is associated with a first shard, "001" is associated with a second shard, "010" is associated with a third shard and "011" is associated with a fourth shard.

The grouping module 220 is software and routines executable by a processor for generating groups of users based on the shards generated by the sharding module 210. A group is a set of users capable of viewing comments from other users in the group; however, users included in a first group are unable to view comments from users in a second group or to provide comments for viewing by users in the second group. Hence, the grouping module 220 allows creation of different areas where users of a group provide comments on content, such as video data, presented to the users within the group. The grouping module 220 includes data identifying a maximum number of groups and a maximum number of users in a group. For example, the grouping module 220 stores data indicating a maximum of four groups are to be created and indicating a maximum of 40 users are included in a group. This allows a user, such as an administrator or a content provider 118, to limit the number of people in a group to facilitate interaction between users within a group.

In one embodiment, the grouping module 220 generates one or more groups of users based on a substring of the shard identifier associated with a shard to generate one or more groups of users. The grouping module 220 determines the one or more groups based on a sharding parameter. For example, if the shard identifier is a binary number, the sharding parameter may specify a number of significant bits and the grouping module 220 identifies the number of significant bits in the binary number and generates a group including users associated with shard identifiers where the number of significant bits matches. For example, the sharding module 210 generates four shards and associates a three-digit binary number with the different shards. In this example, "000" is associated with a first shard, "001" is associated with a second shard, "010" is associated with a third shard and "011" is associated with a fourth shard, and the grouping module 220 identifies two significant bits from the shard identifier. In this example, the grouping module identifies "00" as the two significant bits from the first shard and the second shard and identifies "01" as the two significant bits from the third shard and the fourth shard. The grouping module 220 then generates two groups based on the two significant bits of the shard identifier. Thus, the grouping module 220 generates a first group including users from the first shard and the second shard, which have two significant bits of "00," and generates a second group including users from the third shard and the fourth shard, which have two significant bits of "01."

Additionally, as additional users access content and communicate content from one or more clients 120 to the video hosting site 100, the grouping module 220 determines whether the additional users cause at least one group to include more members than the specified maximum number of users. If the additional users result in a group having more than the maximum number of users, the grouping module 220 modifies the groups to prevent a group from including more than the maximum number of users. In one embodiment, to modify the groups, the grouping module 220 modifies the sharding parameter (e.g., increasing the number of significant bits) and identifies a different substring of the shard identifiers. The grouping module 220 then uses the different substring of the shard identifiers to determine the modified groups. Modification of the users included in the group is further described below in conjunction with FIGS. 3 and 4.

The interface module 230 is software and routines executable by a processor for generating an interface displaying comments received from one or more clients 120 and/or generates an interface for receiving comments from a client 120. For example, the interface module 230 generates an interface including content, such as video data, and comments received from one or more clients 120. In one embodiment, the interface module 230 communicates with the grouping module 220 to identify a group including a user from which a comment is received and to identify other users included in the group. Communicating with the grouping module 220 allows the interface module 230 to present different comments to different groups of users. In one embodiment, the interface generated by the interface module 230, or data describing the interface generated by the interface module 230, is communicated from the video hosting site 100 to a client device 120 via the network 122 to present the interface to a user via the client device 120.

For example, an interface generated by the interface module 230 displays, on a client 120, video data from a content provider 118 and one or more comments associated with the video data received from one or more users. In one embodiment, the interface also includes a data entry region, allowing a user to provide comments for transmission from the client 120 to the comment module 126 via the network 122. For example, the interface includes a text entry region for receiving textual data from a user for presentation as a comment.

Methods

Figure 3:
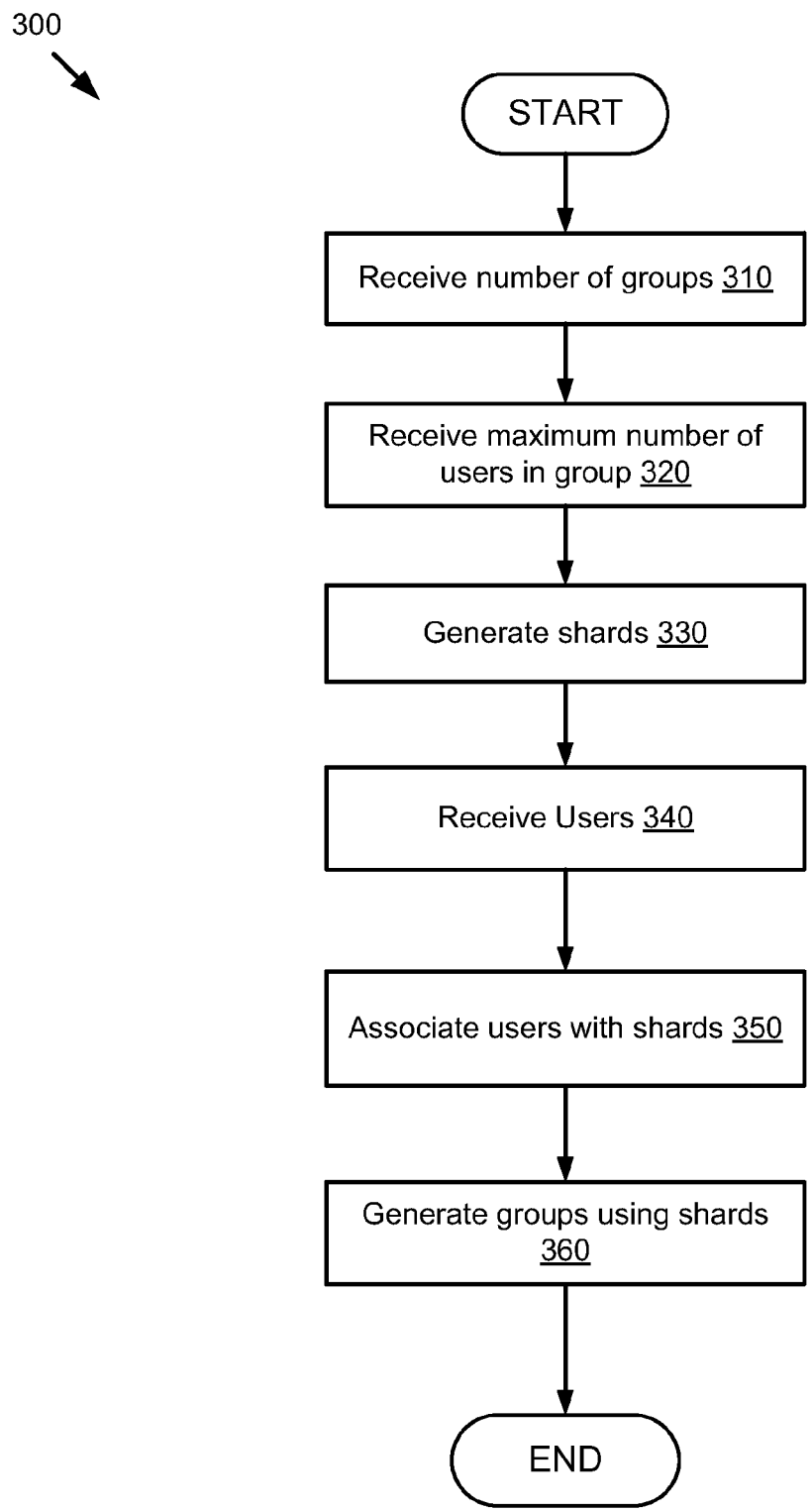
FIG. 3 is a flow chart of a method for initializing groups of users accessing content in accordance with an embodiment.

FIG. 3 is a flow chart of a method 300 for initializing groups of users accessing content according to one embodiment. In one embodiment, the steps described in conjunction with FIG. 3 are implemented by instructions or other data stored on a tangible computer-readable storage medium, such as a flash memory, an optical disk, a hard disk or other suitable storage device, that cause a processor to perform the described steps when executed by the processor. Further, in other embodiments, the method 300 includes different and/or additional steps than those described in conjunction with FIG. 3.

Initially, the grouping module 220 receives 310 data specifying a maximum number of groups and receives 320 data specifying a maximum number of users in a group. In one embodiment, the grouping module 220 receives 310 the maximum number of groups and receives 320 the maximum number of users in a group from a client 120 via the network 122. Alternatively, the grouping module 220 receives 310 the maximum number of groups and receives 320 the maximum number of users in a group from a content provider 118 via the network 122.

The sharding module 210 generates 330 one or more shards based on the received data specifying the maximum number of groups. In one embodiment, the sharding module 210 generates 330 a number of shards based on the specified maximum number of groups. Each shard is represented by a unique binary number of n bits (or n bits of a binary number with other information) where 2n is greater than or equal to the maximum number of groups. For example, if the grouping module 220 receives 320 data specifying a maximum of four (22) groups (n=2), the sharding module 210 generates 330 four shards, each associated with a shard identifier. In one embodiment, the shard identifiers associated with the generated shards are binary numbers. For example, if four shards are generated, a two-digit binary number is associated with each shard. Furthermore, it should be understood that the binary number or bits representing the shard can be prepended or appended to other binary values used to describe other attributes of the group. However, in other embodiments, a different type of shard identifier is associated with the shards.

The comment module 126 then receives 340 user identifiers or other user credentials identifying users accessing content via the video hosting site 126. In one embodiment, the comment module 126 receives user identifiers responsive to a user of a client 120 accessing content via the video hosting site 100. For example, when a user views a video, the client 120 associated with the user transmits a user identifier and a video ID to the comment module 126 via the network 122. In another embodiment, the user provides a user identifier or other user credentials when initially accessing the video hosting site 100 via the network 122, and the user database 114 communicates the user identifier to the comment module 126. Alternatively, the comment module 126 receives a user identifier and a video ID from the client device 120 responsive to a user of the client 120 communicating a comment from a client 120 to the video hosting site 100 via the network 122.

The sharding module 210 then associates 350 the received user identifier with a generated shard. For example, the sharding module 210 associates 350 a received user identifier with a shard identifier. In one embodiment, the sharding module 210 accounts for attributes associated with the user identifier when associating 350 a user identifier with a shard. For example, when a user of a client device 120 provides authentication credentials to the video hosting site 100, the sharding module 210 accesses the user database 114 via the bus 205 and accounts for data included in a user profile within the user database 114 when associating a user with a shard. For example, the sharding module 210 associates 350 users having user profiles including the same, or similar, interests or the same, or similar, locations with a specific shard. Alternatively, the sharding module 210 uses an Internet Protocol (IP) address, or other identifier, associated with the client device 120 to determine a geographic location of the client device 120 from which a user identifier is received and associates 350 users with a shard so that users in the same geographic area are associated 350 with the same shard. This IP geolocation allows the sharding module 210 to associate users in a similar geographic location with the same shard to increase the likelihood that users view comments provided by each other or provide comments for viewing by other users. Thus, in one embodiment, the sharding module 210 accounts for user demographic information and/or location when associating 350 users with shards, increasing the likelihood that the users will provide comments to the video hosting site 100 and view comments provided by each other.

After the sharding module 210 associates 350 one or more user identifiers with shards, the grouping module 220 communicates with the sharding module 210 and generates 360 one or more groups of users based on the shards. In one embodiment, the grouping module 220 identifies a substring of the shard identifier associated with a shard and generates 360 groups of users based on the identified substring of the shard identifier. Hence, the grouping module 220 generates 360 groups including users associated with substrings that have matching subsets of their associated shard identifiers. For example, if the shard identifier is a four binary-digit number, the grouping module identifies the two most significant digits of the shard identifiers and generates 360 a group of users including users associated with shard identifiers having the same two most significant digits. If the shard identifier is a binary number, the grouping module 220 identifies a number of significant bits in the binary number and generates a group including users associated with shard identifiers having matching significant bits. Generating 360 groups of users based on the shard identifier is further described below in conjunction with FIG. 4.

Thus, the comment module 126 associates 350 users with shards then generates 360 groups of users based on the shard identifier associated with the shards. This allows the comment module 126 to generate groups of users for exchanging comments with each other and to dynamically modify the generated groups responsive to additional users interacting with the video hosting site 100 or communicating comments to the video hosting site 100. In one embodiment, the sharding module 210 within the comment module 126 accounts for attributes or preferences of users when associating users with shards to increase the likelihood of users providing and/or viewing comments based on one or more similar user attributes or characteristics.

For example, when there are forty people in a group, the shards are numbered in binary from 0-3 with 10 people assigned to each shard as follows (here, the underlining indicates what is being used as the most significant bit):

First Shard: 0̲00→10
Second Shard: 0̲01→10
Third Shard: 0̲10→10
Fourth Shard: 0̲11→10

The sharding module 210 generates four shards and associates a three-digit binary number with the different shards, so "000" is associated with a first shard, "001" is associated with a second shard, "010" is associated with a third shard and "011" is associated with a fourth shard. When the population is small, as above, only the most significant bit of the shard is used to split the groups. In this example, it is "0" for all the groups. Once the number of users is greater than the number of groups available, then the number of significant bit in the shard is increased. In the example, the grouping module 220 identifies the two most significant bits of the shard identifier. For example, the grouping module 220 identifies "00" as the two most significant bits from the first and second (i.e., "000" and "001") shard and identifies "01" as the two most significant bits of the third and fourth shard (i.e., "010" and "011"). The grouping module 220 then generates two groups based on the two significant bits of the shard identifier, so a first group includes users from the first shard and the second shard, which have two significant bits of "00," and a second group includes users from the third shard and the fourth shard, which have two significant bits of "01." In this example, if there were a total of eighty people (forty more people added) in a conversation, they would be sharded as follows (where the underlining indicates the two significant bits):

First Shard: 0̲0̲0→20
Second Shard: 0̲0̲1→20
Third Shard: 0̲1̲0→20
Fourth Shard: 0̲1̲1→20

All of the users who were assigned to the first two groups will stay on the same shard (0→00), while all of the users who are in the second two groups will migrate to the new sharded group (01). In either case, the users will still be able to see comments from a large number of the users they were already seeing, and nobody ends up in an empty group.

Additionally, as additional users access content and communicate content from one or more clients 120 to the video hosting site 100, the grouping module 220 determines whether the additional users cause a group to include more members than the specified maximum number of users. If adding one or more additional users results in a group exceeding the maximum number of users, the grouping module 220 modifies the groups to prevent a group from exceeding the maximum number of users. In one embodiment, the grouping module 220 identifies a different subset of the shard identifiers and modifies the users included in the groups using the different subset of the shard identifiers. Modification of the users included in the group is further described below in conjunction with FIG. 4.

Figure 4:
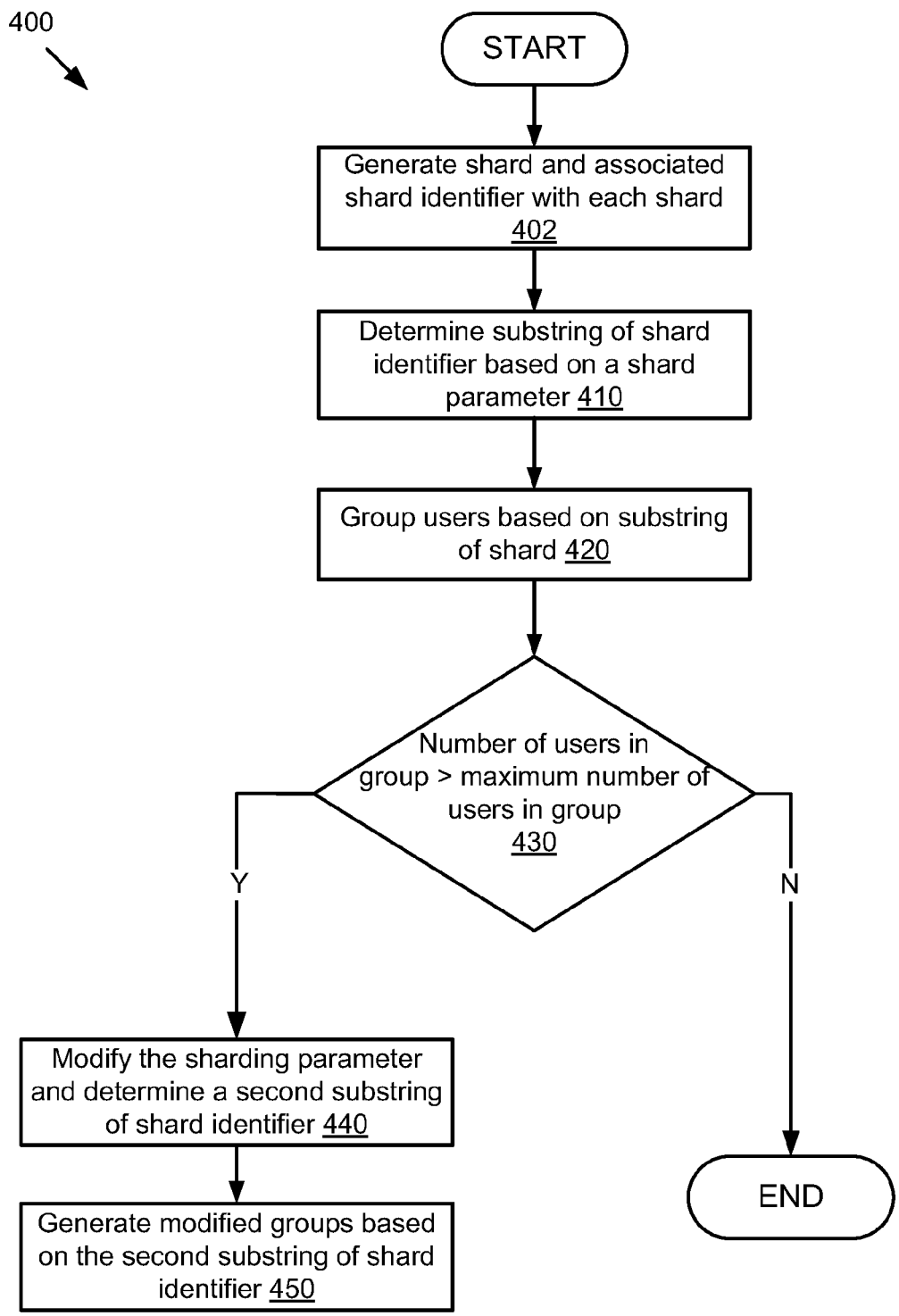
FIG. 4 is a flow chart of a method for generating groups of users accessing content in accordance with an embodiment.

FIG. 4 is a flow chart of a method for generating 360 groups of users accessing content in accordance with one embodiment. In one embodiment, the steps described in conjunction with FIG. 4 are implemented by instructions or other data stored on a tangible computer-readable storage medium, such as a flash memory, an optical disk, a hard disk or other suitable storage device, that cause a processor to perform the described steps when executed by the processor. Further, in other embodiments, the method includes different and/or additional steps than those described in conjunction with FIG. 4.

The grouping module 220 retrieves the shard identifiers from the sharding module 210. For example, the grouping module 220 and the sharding module 210 exchange the shard identifiers. The grouping module 220 generates 402 one or more shards and associates 402 the shard identifier with each shard. From the shard identifiers, the grouping module 220 determines 410 a substring of the shard identifiers based on a sharding parameter. For example, if a shard identifier is a numeric value, the grouping module 220 identifies a substring of digits of the numeric value. As another example, if a shard identifier is a binary number, the sharding parameter may specify a number of significant bits and the grouping module 220 determines 410 one or more bits of the binary number, such as a most significant bit, or the X most significant bits where X is greater than 1, of the binary number.

The grouping module 220 groups 420 users into one or more groups based on the substring of the shard identifiers. For example, the grouping module 220 groups 420 users associated with shard identifiers having the same substring of the shard identifier into a group. Alternatively, the grouping module 220 maps the substring of the shard identifiers to secondary values and generates groups that include users associated with the same secondary value. For example, if the shard identifiers are binary numbers and the grouping module 220 determines that the most significant bit of the shard identifier is used for grouping, the grouping module 220 groups users so that users associated with shard identifiers having the same most significant bit are in a group.

As an example, the sharding module 210 generates four shards with each shard associated with a three digit binary number, such as "000," "001," "010" and "011." The grouping module 220 then determines 410 that the most significant bit of the shard identifier is the substring of the shard identifiers used for grouping users. Accordingly, the grouping module 220 groups 420 users so that users associated with a shard identifier having a most significant bit of "0," in the above example the shard identifiers of "000," "001," "010" and "011" are included in a single group.

After grouping users 420 based on the substring of the shard identifiers, the grouping module 220 determines 430 whether the number of users in at least one group exceeds a maximum number of users in a group. In one embodiment, the grouping module 220 stores data specifying the maximum number of users in a group, allowing an administrator or a content provider 118 to limit the number of users in a group. Limiting the number of users included in a group increases the likelihood that users in a group will provide comments and/or review comments provided by other users included in the group. If the grouping module 220 determines 430 that no group includes a number of users that exceeds the maximum number of users in a group, group generation ends.

However, if the grouping module 220 determines 430 that at least one group includes more users than the maximum number of users in a group, the grouping module 220 modifies 440 the sharding parameter and determines a second substring of the shard identifier based on the modified sharding parameter and generates 450 modified groups based on the second substring of the shard identifier. In one embodiment, the grouping module 220 modifies 440 the sharding parameter and determines a second substring of the shard identifier to include more data from the shard identifier in the substring then generates 450 modified groups based on the second substring of the shard identifier. After generating 450 the modified groups, the grouping module again determines 430 if at least one modified group includes a greater number of users than the stored maximum number of users in a group, as further described above.

Referring to the previous example where the sharding module 210 generates four shards that are each associated with a three digit binary number, such as "000," "001," "010" and "011," the grouping module 220 initially determines 410 that the most significant bit of the shard identifier is the substring of the shard identifiers used for grouping users. Accordingly, the grouping module 220 groups 420 users so that users associated with a shard identifier having a most significant bit of "0," in the above example the shard identifiers of "000," "001," "010" and "011," are included in a single group. However, if the grouping module 220 determines 430 that the group generated using the most significant bit of the shard identifier includes more users than a maximum number of users in a group, the grouping module 220 modifies 440 the substring of the shard identifier used to group users. For example, the grouping module 220 modifies 440 the substring of the shard identifier to include the two most significant bits of the shard identifier.

In the above-described example, the grouping module 220 then generates 450 modified groups of users based on the modified substring of the shard identifier. Hence, the grouping module 220 generates 450 modified groups using the two most significant bits of the shard identifier. So, the grouping module 220 generate 450 modified groups where users associated with shard identifiers having the two most significant bits of "00" are in a first group and users associated with a shard identifier having the two most significant bits of "01" are in a second group. Therefore, the modified groups are a first group including users associated with the shard identifiers "000" and "001" and a second group including users associated with the shard identifiers "010" and "011."

By modifying 440 the substring of the shard identifier and generating 450 modified groups, the grouping module 220 allows the number of users exchanging comments to be limited while also increasing the likelihood of different users within a group providing comments to the video hosting site 100. By grouping users subject to a maximum number of users in a group, the comment module 126 limits the number of users from which comments are received to facilitate subsequent review of the comments. Further, using a substring of the shard identifiers associated with users prevents a group from including a single user and allows users to continue to view at least a substring of the comments provided by other users prior to generating 450 groups using the modified substring of the shard identifier.

The foregoing description of the embodiments has been presented for the purposes of illustration and description. It is not intended to be exhaustive or to limit the present embodiments to the precise form disclosed. Many modifications and variations are possible in light of the above teaching. It is intended that the scope of the present embodiments be limited not by this detailed description, but rather by the claims of this application. As will be understood by those familiar with the art, the present embodiments may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiments or its features may have different names, divisions and/or formats. Furthermore, as will be apparent to one of ordinary skill in the relevant art, the modules, routines, features, attributes, methodologies and other aspects of the present embodiments can be implemented as software, hardware, firmware or any combination of the three. Also, wherever a component, an example of which is a module, of the present embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiments are in no way limited to implementation in any specific programming language, or for any specific operating system or environment. Accordingly, the disclosure intended to be illustrative, but not limiting, of the scope of the embodiments, which is set forth in the following claims.

What is claimed is:

1. A method comprising:
    identifying, by a processing device, a set of sharding parameters comprising a number of user groups and a set of attributes for each user group, wherein the set of sharding parameters specifies a number of most significant bits;
    defining one or more shards based on the number of user groups, a shard identifier being associated with each of the one or more shards, and wherein the shard identifier comprises a binary number;
    creating a user group based on the set of sharding parameters;
    in response to determining that a number of users in the created group exceeds a maximum number of users, modifying the set of sharding parameters by increasing the number of most significant bits; and
    generating one or more modified groups based on the modified set of sharding parameters.

2. The method of claim 1, wherein the set of attributes comprises at least one of a language, a geographic location, a user profile, demographic information associated with a user, or a user interest.

3. The method of claim 1 further comprising presenting a comment entered by a first user from a first group to a second user from the first group, wherein the first group is one of the modified groups.

4. The method of claim 1, further comprising:
    identifying a user identifier associated with a user accessing content, the user being associated with at least one attribute of the set of attributes; and
    associating the user with the user group based on the at least one attribute.

5. The method of claim 1, wherein a number of shards equals a maximum number of groups.

6. An apparatus comprising:
    a memory; and a processing device coupled to the memory, the processing device to:
- identify a set of sharding parameters comprising a number of user groups and a set of attributes for each user group, wherein the set of sharding parameters specifies a number of most significant bits,
- define one or more shards based on the number of user groups, a shard identifier being associated with each of the one or more shards, and wherein the shard identifier comprises a binary number,
- create a user group based on the set of sharding parameters,
- in response to determining that a number of users in the created group exceeds a maximum number of users, modify the set of sharding parameters by increasing the number of most significant bits, and
- generate one or more modified groups based on the modified set of sharding parameters.

7. The apparatus of claim 6, wherein the set of attributes comprises at least one of a language, a geographic location, a user profile, demographic information associated with a user, or a user interest.

8. The apparatus of claim 6, wherein the processing device is further to present a comment entered by a first user from a first group to a second user from the first group, wherein the first group is one of the modified groups.

9. The apparatus of claim 6 wherein the processing device is further to:
- identify a user identifier associated with a user accessing content, the user being associated with at least one attribute of the set of attributes, and
- associate the user with the user group based on the at least one attribute.

10. The apparatus of claim 6, wherein a number of shards equals a maximum number of groups.

11. A non-transitory computer readable storage medium having instructions that, when executed by a processing device, cause the processing device to perform operations comprising:
- identifying a set of sharding parameters comprising a number of user groups and a set of attributes for each user group, wherein the set of sharding parameters specifies a number of most significant bits;
- defining, by the processing device, one or more shards based on the number of user groups, a shard identifier being associated with each of the one or more shards, and wherein the shard identifier comprises a binary number;
- creating a user group based on the set of sharding parameters;
- in response to determining that a number of users in the created group exceeds a maximum number of users, modifying the set of sharding parameters by increasing the number of most significant bits; and
- generating one or more modified groups based on the modified set of sharding parameters.

12. The non-transitory computer readable storage medium of claim 11, wherein the set of attributes comprises at least one of a language, a geographic location, a user profile, demographic information associated with a user, or a user interest.

13. The non-transitory computer readable storage medium of claim 11, the operations further comprising presenting a comment entered by a first user from a first group to a second user from the first group, wherein the first group is one of the modified groups.

14. The non-transitory computer readable storage medium of claim 11, the operations further comprising:
- identifying a user identifier associated with a user accessing content, the user being associated with at least one attribute of the set of attributes; and
- associating the user with the user group based on the at least one attribute.

15. The non-transitory computer readable storage medium of claim 11, wherein a number of shards equals a maximum number of groups.

* * * * *